US011467101B2

(12) United States Patent
Cheng et al.

(10) Patent No.: US 11,467,101 B2
(45) Date of Patent: Oct. 11, 2022

(54) SYSTEM FOR ASCERTAINING OPTICAL CHARACTERISTICS OF GEMSTONE

(71) Applicant: GOLDWAY TECHNOLOGY LIMITED, Hong Kong (CN)

(72) Inventors: Ka Wing Cheng, Hong Kong (CN); Koon Chung Hui, Hong Kong (CN)

(73) Assignee: GOLDWAY TECHNOLOGY LIMITED, Hong Kong (CN)

( * ) Notice: Subject to any disclaimer, the term of this patent is extended or adjusted under 35 U.S.C. 154(b) by 0 days.

(21) Appl. No.: 17/435,643

(22) PCT Filed: Feb. 28, 2020

(86) PCT No.: PCT/CN2020/077236
§ 371 (c)(1),
(2) Date: Sep. 1, 2021

(87) PCT Pub. No.: WO2020/177631
PCT Pub. Date: Sep. 10, 2020

(65) Prior Publication Data
US 2022/0042925 A1    Feb. 10, 2022

(30) Foreign Application Priority Data

Mar. 1, 2019    (HK) .................. 19120292.8

(51) Int. Cl.
*G01N 21/958*    (2006.01)
*G01N 21/88*     (2006.01)

(52) U.S. Cl.
CPC ....... *G01N 21/958* (2013.01); *G01N 21/8851* (2013.01); *G01N 2201/022* (2013.01); *G01N 2201/061* (2013.01); *G01N 2201/065* (2013.01)

(58) Field of Classification Search
CPC ............. G01N 21/958; G01N 21/8851; G01N 2201/022; G01N 2201/061; G01N 2201/065
See application file for complete search history.

(56) References Cited

U.S. PATENT DOCUMENTS 4,482,245 A   11/1984  Makabe et al.
5,597,237 A * 1/1997   Stein ................... G01J 5/0003
                                                  250/228

(Continued)

FOREIGN PATENT DOCUMENTS

CN    201497701 U    6/2010
CN    203249873 U    10/2013

(Continued)

OTHER PUBLICATIONS

International Search Report and Written Opinion of International Searching Authority for International Application No. PCT/CN2020/077236.

(Continued)

Primary Examiner — Michael A Lyons
Assistant Examiner — Jarreas C Underwood
(74) Attorney, Agent, or Firm — JCIP; Joseph G. Chu; Jeremy I. Maynard

(57) ABSTRACT

A system (100) for viewing and ascertaining optical characteristics of gemstones, said system including a first and second integrating sphere (150,150a), wherein each integrating sphere (150,150a) is in optical communication with each other and having a spacer portion (116) disposed therebetween, a first light source (118) engaged with the first sphere (150) and for providing light to the interior of the first sphere (150) and a second light source (118a) engaged with the second sphere (150a) and for providing light to the interior of the second sphere (150a); at least one optical image acquisition device (110) in communication with the (Continued)

interior of one of the spheres for acquisition of an optical image of a gemstone disposed in a region between the spheres; a transparent platform (117) for supporting the gemstone between the two integrating spheres (150,150a); and a control module (120) in communication with the optical image acquisition device (110), for controlling the acquisition of optical images of gemstones thereof; wherein said optical image of the gemstone is processed by a processor to ascertain one or more optical characteristics of the gemstone.

21 Claims, 10 Drawing Sheets

(56) References Cited

U.S. PATENT DOCUMENTS

| | | | | |
|---|---|---|---|---|
| 8,878,145 B1* | 11/2014 | Liu | ............... | G01N 21/87 |
| | | | | 250/461.1 |
| 2007/0153256 A1* | 7/2007 | Liu | ............... | G01J 3/465 |
| | | | | 356/30 |
| 2009/0147241 A1 | 6/2009 | Shlezinger et al. | | |
| 2012/0179290 A1* | 7/2012 | Lo | ............... | B07C 5/3425 |
| | | | | 901/14 |
| 2015/0316411 A1* | 11/2015 | McCord | ............... | H05B 45/50 |
| | | | | 356/402 |
| 2016/0199985 A1* | 7/2016 | Ganninger | ............... | B44C 1/18 |
| | | | | 156/367 |
| 2016/0232432 A1 | 8/2016 | Regev | | |
| 2016/0290925 A1* | 10/2016 | Takahashi | ............... | G01N 21/6456 |
| 2016/0290930 A1 | 10/2016 | Takahashi | | |
| 2021/0131974 A1* | 5/2021 | Ioffe | ............... | G01N 21/251 |

FOREIGN PATENT DOCUMENTS

| | | | |
|---|---|---|---|
| CN | 105831905 A | | 8/2016 |
| CN | 108627521 A | | 10/2018 |
| CN | 109374633 A | | 2/2019 |
| CN | 109991230 A | | 7/2019 |
| CN | 111837024 A | * | 10/2020 |
| EP | 3505917 A1 | | 7/2019 |
| JP | H09311074 A | | 12/1997 |
| WO | 2019129251 A1 | | 7/2019 |
| WO | 2020177631 A1 | | 9/2020 |

OTHER PUBLICATIONS

Hong Kong Search Report for Application No. HK 19120292.8.
Examination Report from the Canadian Patent Office dated Mar. 18, 2022 for Canadian Application No. 3,132,073.
Examination Report from the Indian Patent Office dated Mar. 31, 2022 for Indian Application No. 202117043951.
Examination Search Report for Canadian Application No. 3132073.
European Search Report for European Application No. 20765868.3.

\* cited by examiner

SYSTEM FOR ASCERTAINING OPTICAL CHARACTERISTICS OF GEMSTONE

TECHNICAL FIELD

The present invention relates to a system for viewing gemstones, and for ascertaining optical characteristics of gemstones. More particularly, the present invention provides a system for ascertaining optical characteristics of a diamond.

BACKGROUND OF THE INVENTION

Gemstones, particularly diamonds, are a key component utilized in luxury goods, in particular in articles of jewellery, and can have a very great value. The value of a diamond depends on several physical properties of the diamond.

There are four globally accepted standards utilized to assess the quality of a diamond, typically known as the 4C's, which are Clarity, Colour, Cut and Carat Weight.

Colour Grading

For a diamond, with the exception colour of a diamond which may have a particular or fancy colour, the value of a diamond is highly dependent on what is known as its colourlessness. The more colourless the diamond, the higher.

By way of example, the Gemological Institute of America (GIA) has a colour grade from D to Z, for which the D grade denotes a diamond which is completely colourless, and ranging to a Z grade which denotes a diamond having a significant amount of unwanted colour.

FIG. 9a shows the Gemological Institute of America (GIA) colour scale, against which a colour grading is applied, with the grades shown from colourless to light.

Although the human visual recognition of a different diamond colour is not particularly sensitive in particular in relation to diamonds of similar grades, only a slightly change in colour can significantly affect the value of the diamond.

Several factors contribute to the colour of a diamond, the most common and important factor being impurities within a diamond. During the formation process of diamonds, impurities can be easily incorporated. Nitrogen is the most common impurity found in natural diamonds, which produces an unwanted yellow colour. The higher nitrogen content in a diamond, the deeper colour and hence lower colour grade the stone is. Boron can also affect diamond colour of a diamond, but is less common. Diamonds with boron impurity shows light blue colour. There are other impurities also affect diamond colour but they are rare.

Apart from impurities, vacancy defects within a diamond also contribute to colour of a diamond. There are different forms of vacancies, such as isolated vacancy, multivacancy complex, and vacancy combining with impurities, etc.

In some diamonds, due to the ambient pressure conditions during the formation process deep in the earth, the carbon atoms may not form ideal tetrahedral structures, and the tetrahedral structures may be deformed. Such crystal deformation remains in natural diamond can also cause colour changes. For the assessment on the colour of a diamond, the most accepted industry standard and practice to determine a diamond's colour is by trained human eyes.

Using GIA as an example, colour grading personnel are trained for several months utilising standard master stones from a master stone set with assorted colour grades. Moreover, during the colour grading process, a diamond under assessment is compared with the master stones side by side in a controlled environment.

The controlled environment is a standard light box with a white tile to place behind the master stones and testing diamond as a backdrop. Under this standardized environment, the colour of a diamond can be graded by referring it to the master stone with the nearest colour.

A diamond is typically viewed from below at about 45 degrees to the pavilion, with a colour grader looking primarily towards the table of the diamond.

Repetitive training of colour graders is applied, with a view so that different graders can reproduce the same assessment results, with a view to providing uniformity and consistency between colour grading personnel. Although such a colour grading process is extensively used and under this strict colour grading procedures, the reliability and repeatability of the colour grading methodology are still prone to inconsistencies, and such inconsistencies can cause incorrect grading which can adversely impact upon the value of a diamond.

Clarity Grading

By way of example, the Gemological Institute of America (GIA) has a clarity grade as shown in FIG. 9b.

For the assessment on the clarity of a diamond, the quantity, size, and position of the defects within the stone are required to be determined.

From the formation conditions under the earth of a diamond to the human applied processes performed on the diamond, different defects can be formed.

Inside the diamond body, there can be impurities, voids and cracks, which are considered internal defects. On the diamond surface, there can be under-polished irregularities and scratches, which are considered external defects.

These internal and external characteristics are also important with respect to a diamond as they can be one of the unique identifying marks or "birthmarks" that can be used for identifying a diamond.

Currently, the most accepted practices to determine a diamond's clarity is by trained human eyes under 10× microscope. Gemologists are trained for several months by standard samples with different type of defects with a view that a stone when assessed by different people should reproduce the same assessment result.

However, even under standardized training and assessment procedures, the repeatability cannot be guaranteed because of unavoidable subjective human judgement.

Assessment on the same diamond by the same person at different time may also result different clarity grades being applied to the same diamond. Because of human's vision tiredness, different judgement on the same diamond may also be made before and after assessments on many different stones.

Therefore, even for trained and experienced professional gemologists, such gemologists still experience difficultly for providing repeatability in clarity assessment.

OBJECT OF THE INVENTION

It is an object of the present invention to provide a system for viewing of a gemstone and ascertaining the optical properties of a gemstone, and more particularly a system useful for determining the colour and clarity grading of a gemstone, in particular a diamond, which overcomes or at least partly ameliorates at least some deficiencies as associated with the prior art.

SUMMARY OF THE INVENTION

A system for viewing and ascertaining optical characteristics of gemstones, said system including a first and second integrating sphere, wherein each integrating sphere is in optical communication with each other and having a spacer portion disposed therebetween, a first light source engaged with the first sphere and for providing light to the interior of the first sphere and a second light source engaged with the second sphere and for providing light to the interior of the second sphere; at least one optical image acquisition device in communication with the interior of one of the spheres for acquisition of an optical image of a gemstone disposed in a region between the spheres; a transparent platform for supporting the gemstone between the two integrating spheres; and a control module in communication with the optical image acquisition device, for controlling the acquisition of optical images of gemstones thereof, wherein said optical image of the gemstone is processed by a processor to ascertain one or more optical characteristics of the gemstone.

The interior of the integrating spheres is covered with a diffuse reflective coating such that light rays incident on any point on the inner surface are, by multiple scattering reflections, distributed equally to all other points, and the effects of the original direction of the light sources are minimized.

The system may further include a mechanical arm controlled by the control module, for delivery of a gemstone from external of the integrating spheres to the platform for supporting the gemstone between the two integrating spheres.

The mechanical arm allows for movement in a vertical direction for picking up and releasing the gemstone, and rotation about an axis for transporting the gemstone from one position to the other.

The system may further include a movable door located at the spacer portion, which is openable to allow the gemstone to be transported to and from the support platform by the mechanical arm.

The system may include a plurality of one optical image acquisition devices in communication with the interior of at least one of the spheres.

The system may include a first optical image acquisition device in communication with the interior of the first sphere at the pole of the sphere.

The system may include a further optical image acquisition device in communication with the interior of the second sphere at the pole of the sphere.

The system may include one or more optical image acquisition devices for acquiring a side image of the gemstone, wherein one or more optical image acquisition devices acquires said side image of the gemstone through an aperture extending through the spacer portion.

The system may include one or more optical image acquisition devices for acquiring an inclined image of the gemstone, wherein one or more optical image acquisition devices is directed towards the gemstone and is inclined to an axis extending through the poles of the spheres.

The one or more optical image acquisition devices is may be directed towards the gemstone and is inclined at an angle in the range of from 40 degrees to 50 degrees to an axis extending through the poles of the spheres.

The at least one optical image acquisition device may be located at a distance in the range of 100 mm and 300 mm from the gemstone.

The at least one optical image acquisition device may be located at a distance of about 200 mm from the gemstone.

The at least one optical image acquisition device may be located at a distance in the range of from 20 mm to 100 mm from the gemstone.

The light sources preferably provide said predetermined constant light level of colour temperature 6500K.

The light source may be selected from the group including an LED (Light Emitting Diode) light source, a Xeon lamp light source, and incandescent light source, and fluorescent lamp light source, a solar simulator or the like.

The platform may be rotatable about the central axis extending between the pole of the spheres and within the system of integrating spheres, and provides for rotation of the gemstone about the central axis such that a plurality of optical images of the gemstones can be acquired by the at least one optical image acquisition devices.

The optical image acquisition device is a digital camera. The optical image acquisition device may be monochromatic or polychromatic.

The system may provide for determining the colour of a gemstone, or may provide for determining the clarity of a gemstone.

Preferably, the gemstone is a diamond.

BRIEF DESCRIPTION OF THE DRAWINGS

In order that a more precise understanding of the above-recited invention can be obtained, a more particular description of the invention briefly described above will be rendered by reference to specific embodiments thereof that are illustrated in the appended drawings. The drawings presented herein may not be drawn to scale and any reference to dimensions in the drawings or the following description is specific to the embodiments disclosed.

DETAILED DESCRIPTION OF THE DRAWINGS

The present inventors have identified shortcomings in the manner in which colour and clarity grading of diamonds is performed, and upon identification of the problems with the prior art, have provided a system which is more consistent and reliable, and overcomes the problems of the prior art.

Figure 1A:
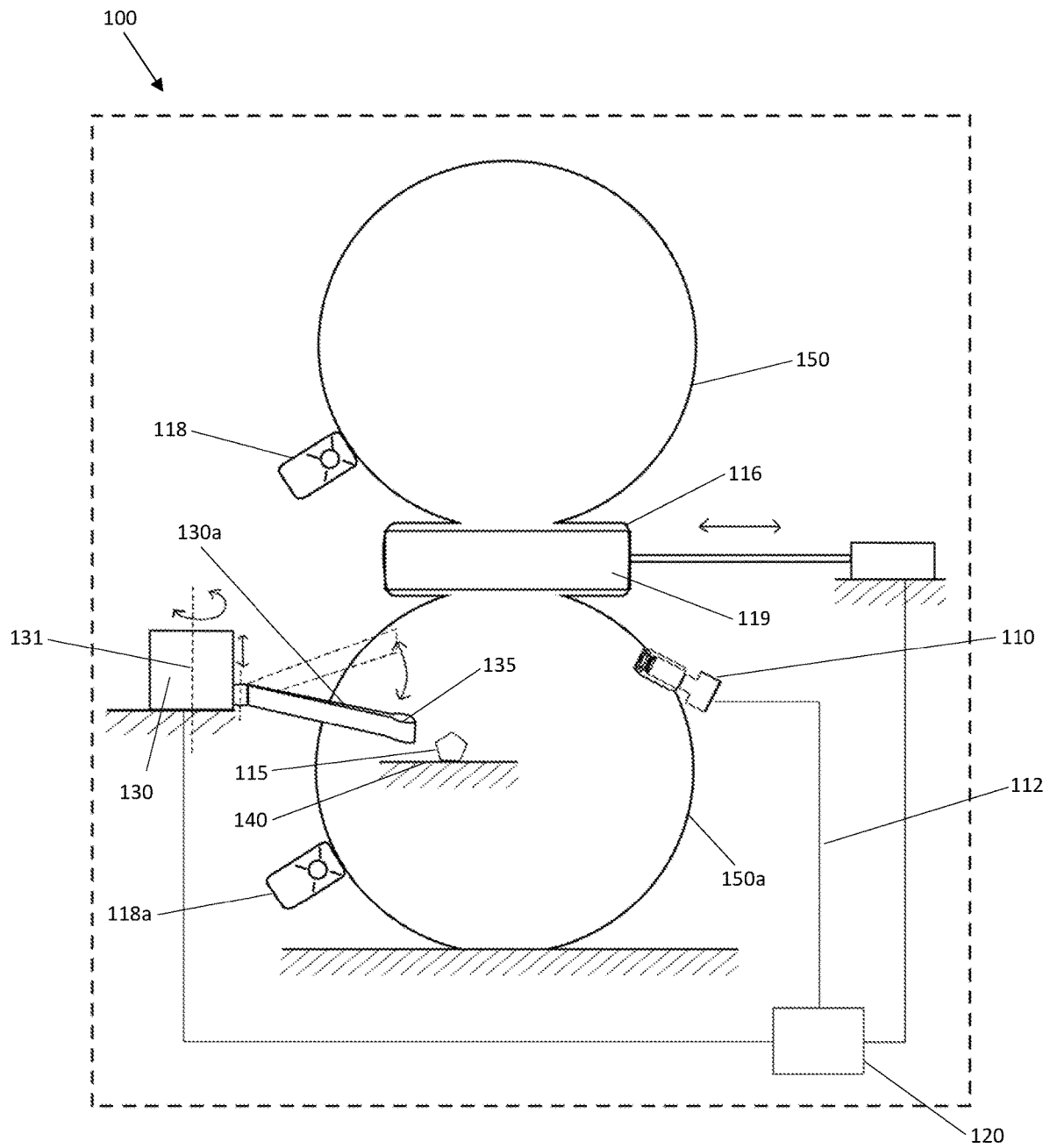
FIG. 1a shows a schematic representation of a system according to the present invention.

Referring to FIG. 1a, there is shown a schematic representation of a system 100 in accordance with the present invention, wherein the system 100 provides an optically controlled environment for acquiring optical images for ascertaining optical properties for gemstone, for example the colour and clarity grading of diamonds.

As is shown in FIG. 1a, the system 100 includes two hollow integrating spheres 150 and 150a in optical communication with each other adjoining at the spacer portion 116 and being spaced apart by the spacer portion 116. Light sources 118 and 118a are located at each sphere in order to provide a predetermined constant light level within the system of integrating spheres.

The spacer portion 116 is suitably sized so as to provide a region for the delivery and holding of a gemstone for image acquisition, and may have a height for example of 100 mm, or about 50 mm, or less, or more depending upon the arrangement.

The interior of the integrating spheres 150 and 150a is covered with a diffuse reflective coating, such that light rays incident on any point on the inner surface are, by multiple scattering reflections, distributed equally to all other points, and the effects of the original direction of the light sources 118 and 118a are minimized.

The optical image acquisition device 110 at the integrating spheres system is in communication with the control unit 120. The control unit 120 can control the acquisition of optical images of the gemstone, which is depicted for example as a diamond 115 when located between the integrating spheres 150, 150a as shown in FIG. 1c and as described with reference to FIG. 1d below.

An image can be acquired at a predetermined angle and predetermined side of the gemstone, depending upon where the optical image acquisition device 110 is disposed, which in this example is shown as being below the gemstone and directed upwardly at an angle to the central axis of the diamond 115. Alternatively, there could be more than the optical image acquisition device 110 at different angles above, below or both the diamond 115.

The acquired images can be further analysed for ascertaining optical properties for gemstone, for example the colour and clarity grading of diamonds.

The system 100 also may include, as shown in FIGS. 1a-1d and FIG. 2, a mechanical arm assembly 130 for transporting the gemstone, such as a diamond 115, automatically into and out of the integrating spheres, and an actuator arrangement such as a pneumatic system for operating a mechanical arm 130a.

Referring to FIG. 1a, the mechanical arm 130a is moveable in a vertical direction for picking up and releasing the diamond 115, and is also rotatable about the central axis 131 for transporting the diamond 115 from one position to the other.

Such movement and position accuracy of the mechanical arm 130a is controlled and determined by the control module 120.

To initialise the image acquisition process of the system 100, a technician or another automated device, is required to first place the diamond 115 onto the surface 140 which is located outside of the integrating spheres 150 and 150a as is apparent from FIG. 2 which is described further below.

The diamond 115 is typically placed tabled-down onto the surface 140, with the pavilion facing upwards, although in other embodiments it may be positioned at alternate orientations.

Upon placing the diamond 115 onto the surface 140, the mechanical arm 130a then rotates about the axis 131 until the claws portion 135 of the mechanical arm 130a arrives right above the diamond 115. The diamond 115 is then ready to be picked up by the claw portion 135 of the mechanical arm 130a.

Figure 1B:
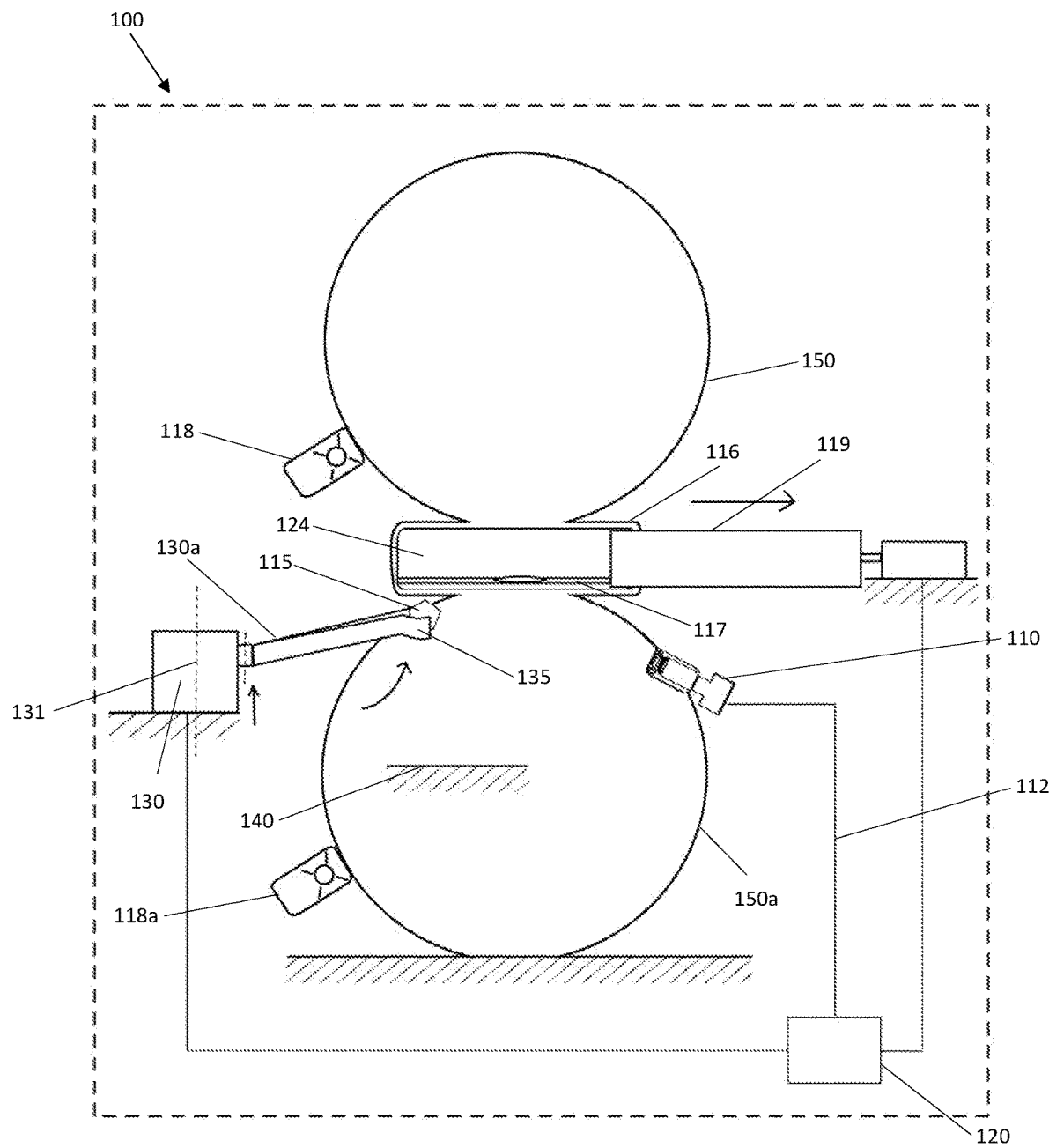
FIG. 1b-1d show schematic representations of a system of FIG. 1, when a gemstone, in this example a diamond, is being transported from the outside into the integrating spheres system.
Figure 1C:
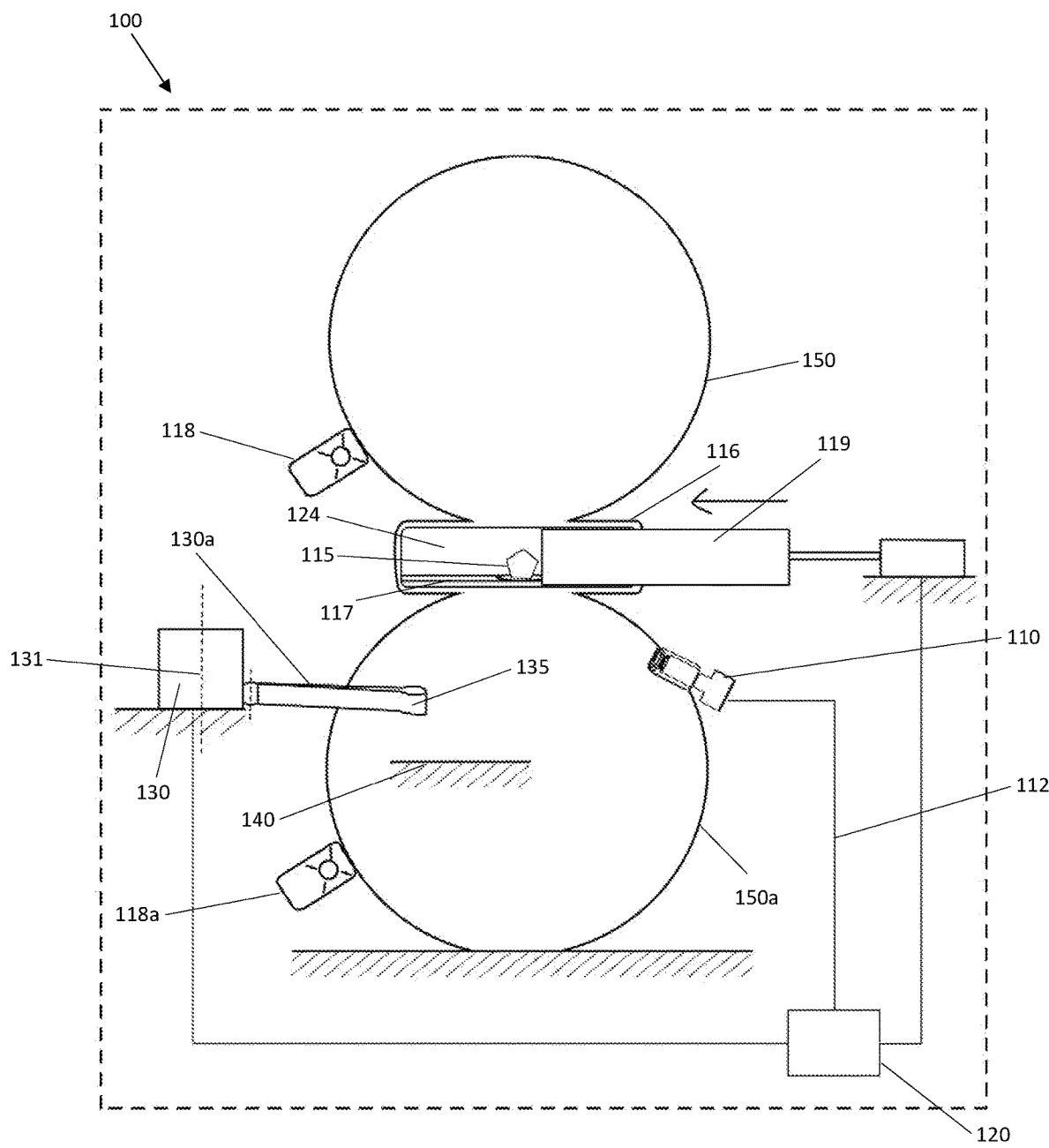

The pick-up process of the diamond 115 is illustrated in FIG. 1b, wherein the two claws 135a and 135b of the mechanical arm 130a move outwardly away from each other, again which may be pneumatically controlled, while the mechanical arm 130a dips down to reach the same horizontal level as the diamond 115 on the surface 140.

The two claws 135a and 135b then move inwardly urging towards the diamond 115 to secure the diamond 115 safely therein, and the mechanical arm 130 moves vertically upwards in order to lift the diamond 115 vertically away from the surface 140.

When the diamond 115 is being picked up by the mechanical arm 130, a sliding door 119 slides horizontally to the side of the integrating spheres system and reveals the aperture 124 at the spacer portion 116, through which the diamond 115 is allowed to be transported into the integrating spheres 150 and 150a. The movement of the sliding door 119 may be controlled by the control module 120, and for example by a pneumatic actuator, or alternatively manually or via another system.

Figure 2:
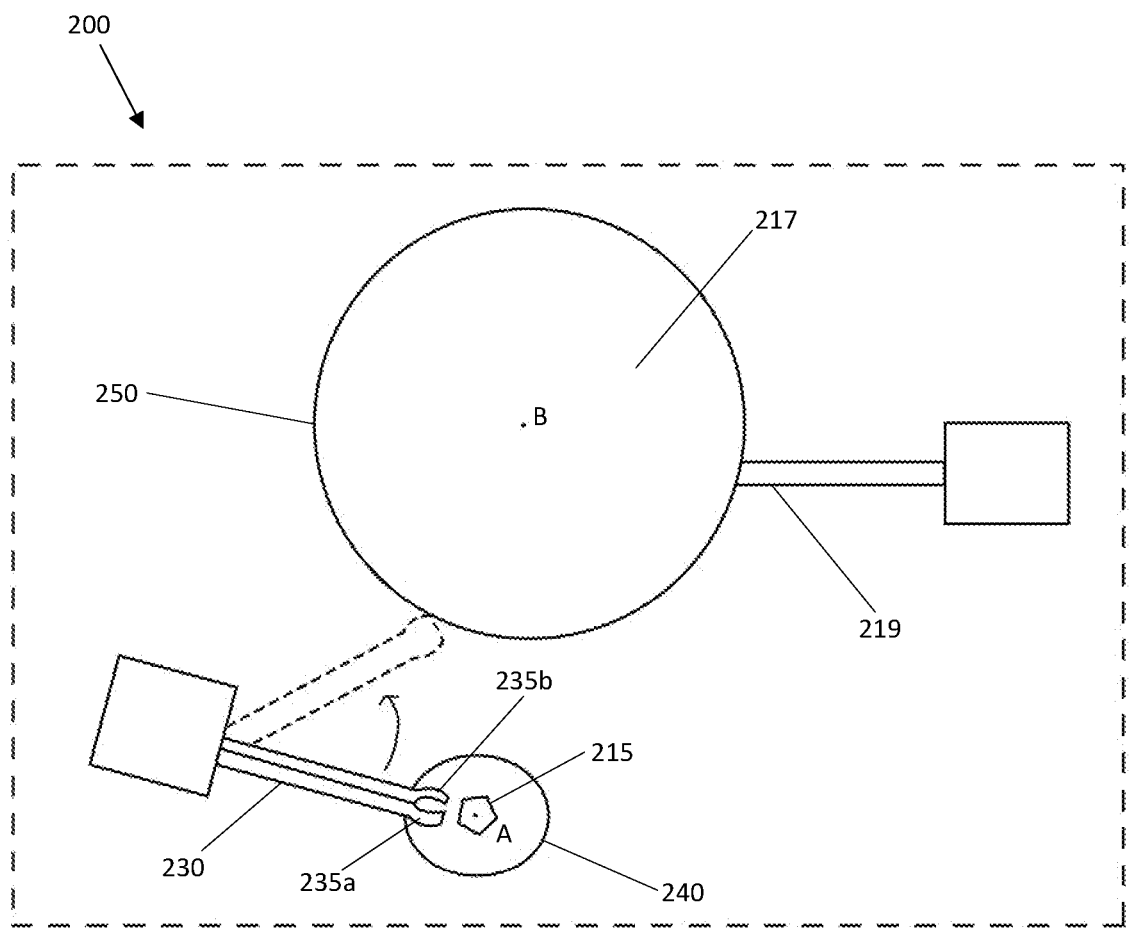
FIG. 2 shows a schematic representation of a top view of an embodiment of the present invention.

By of example, such transporting of a diamond 215 is further shown in the embodiment of FIG. 2, whereby a mechanical arm 230 rotates about an axis and transports the diamond 215 from position A on the surface 240 to a predetermined position B right above the rotational platform 217, within the integrating spheres system.

The claws 235a and 235b of the mechanical arm 230 then move outwardly away from each other to release the diamond 215 onto the position B rotational platform 217, which is usually the centre of a rotational platform 217.

Referring back to FIG. 1a-1d, a rotational platform 117 is located at the spacer portion 116 where the two integrating spheres 150 and 150a adjoin.

The rotational platform 117 is rotatable about the central axis of the system and thus the diamond 115 and within the integrating spheres 150 and 150a, such that a plurality of optical images of different views of the diamond 115 can be acquired by the optical image acquisition device 110, in some embodiments.

The rotational platform 117 is optically transparent such that it does not optically block light rays from either side of the platform 117.

Control of movement of the rotational platform 117 may be performed by the control module 120.

This automatic transport of the diamond 115 by the mechanical arm 130a allows the diamond 115 to always be placed accurately at a predetermined position on the rotational platform 117, and as such to provide the most desirable lighting condition to the diamond 115 when optical images are acquired for viewing and grading purposes thereof.

Further, since the mechanical arm 130a is mechanically controlled by the control unit 120, with no human factors involved therein, such as misalignment or misplacing of the diamond, and the position of the diamond 115 on the rotational platform 117 is always consistent and with high repeatability, and thus providing a controlled environment for examination for different diamonds.

Due to the visual nature of the optical properties of clarity and colour, the assessment of clarity and colour of a diamond needs to be done in a controlled environment. The computerized system 100 ensures the lighting conditions and the background for every diamond are the same and constant.

Referring now to FIG. 1c, there is shown the diamond 115 being placed accurately on the rotational platform 117 within the integrating spheres system. The mechanical arm 130a then rises, and rotates about central axis 131 to move out of the integrating spheres 150 and 150a, though the aperture 124.

Figure 1D:
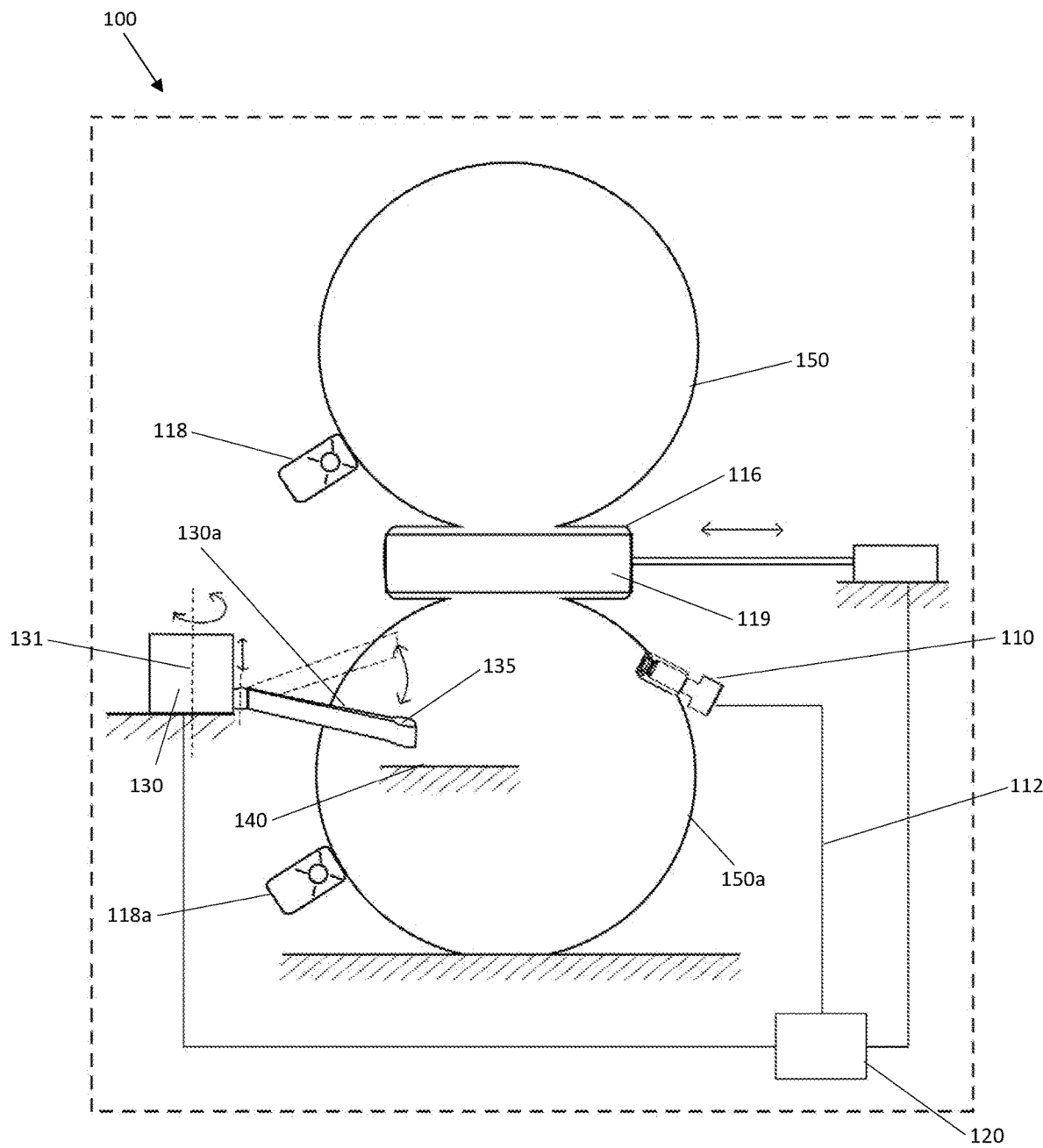

When the mechanical arm 130a moves out of the integrating spheres 150 and 150a, the sliding door 119 slides horizontally towards the integrating spheres system and close the aperture 124, such that the aperture 124 is covered by the sliding door 119 again, as illustrated in FIG. 1d, forming a close system therein ready for the image acquisition process of the diamond 115 to take place.

Figure 3:
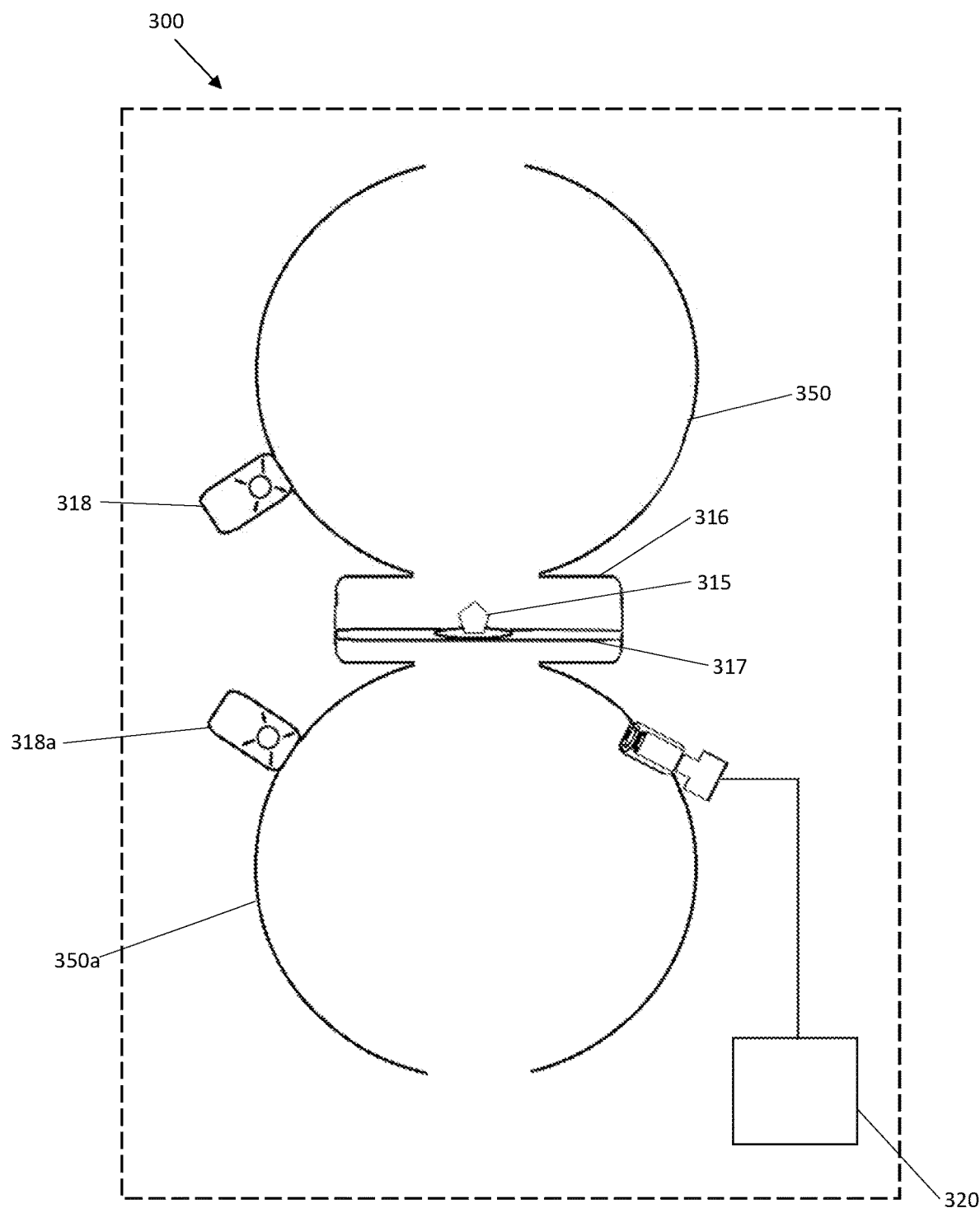
FIG. 3 shows a schematic representation of the sectional view of an embodiment of the integrating spheres system according to the present invention.

Referring now to FIG. 3, there is shown a sectional view of system 300 in one of the embodiments of the present invention.

As shown in FIG. 3, the system 300 includes two integrating spheres 350 and 350a adjoining at spacer portion 316 and being spaced apart by the spacer portion 316.

The optical image acquisition device 310 at the integrating spheres system is in communication with the control unit 320. The control unit 320 controls the acquisition of optical images of the diamond inclined at an angle for example 45 degrees with respect to the central vertical axis of the diamond 315.

The acquired images will be further analysed for ascertaining optical properties for gemstone, for example the colour and clarity grading of the diamond 315.

The optical image acquisition devices 310 may be located at a distance of about 200 mm from the diamond 315, or less, or more, depending upon the requirements of the system and the particular integers and features used to form the system 300.

The system 300 includes two light sources 318 and 318a providing a predetermined constant light level is of colour temperature 6500K within each integrating sphere 350 and 350a. The light source is selected from the group including an LED (Light Emitting Diode) light source, a Xeon lamp light source, and incandescent light source, and fluorescent lamp light source, a solar simulator or the like, so as to provide a predetermined constant light level within the spheres 350 and 350a of colour temperature 6500K.

Similarly, the two light sources 118 and 118a of FIGS. 1a-1d, also provide a predetermined constant light level, and may have a colour temperature 6500K within each integrating sphere 150 and 150a. The light source may be selected from the group including an LED (Light Emitting Diode) light source, a Xeon lamp light source, and incandescent light source, and fluorescent lamp light source, a solar simulator or the like, so as to provide a predetermined constant light level within the spheres 150 and 150a of colour temperature 6500K.

Again referring to FIG. 3, the system 300 further includes a rotational platform 317 rotatable about the central axis of the diamond 315 and within the integrating spheres 350 and 350a, wherein the rotational platform 317 provides for rotation of the diamond about the central axis such that the plurality of optical images of the diamond 315 can be acquired by the optical image acquisition device 310.

Figure 4:
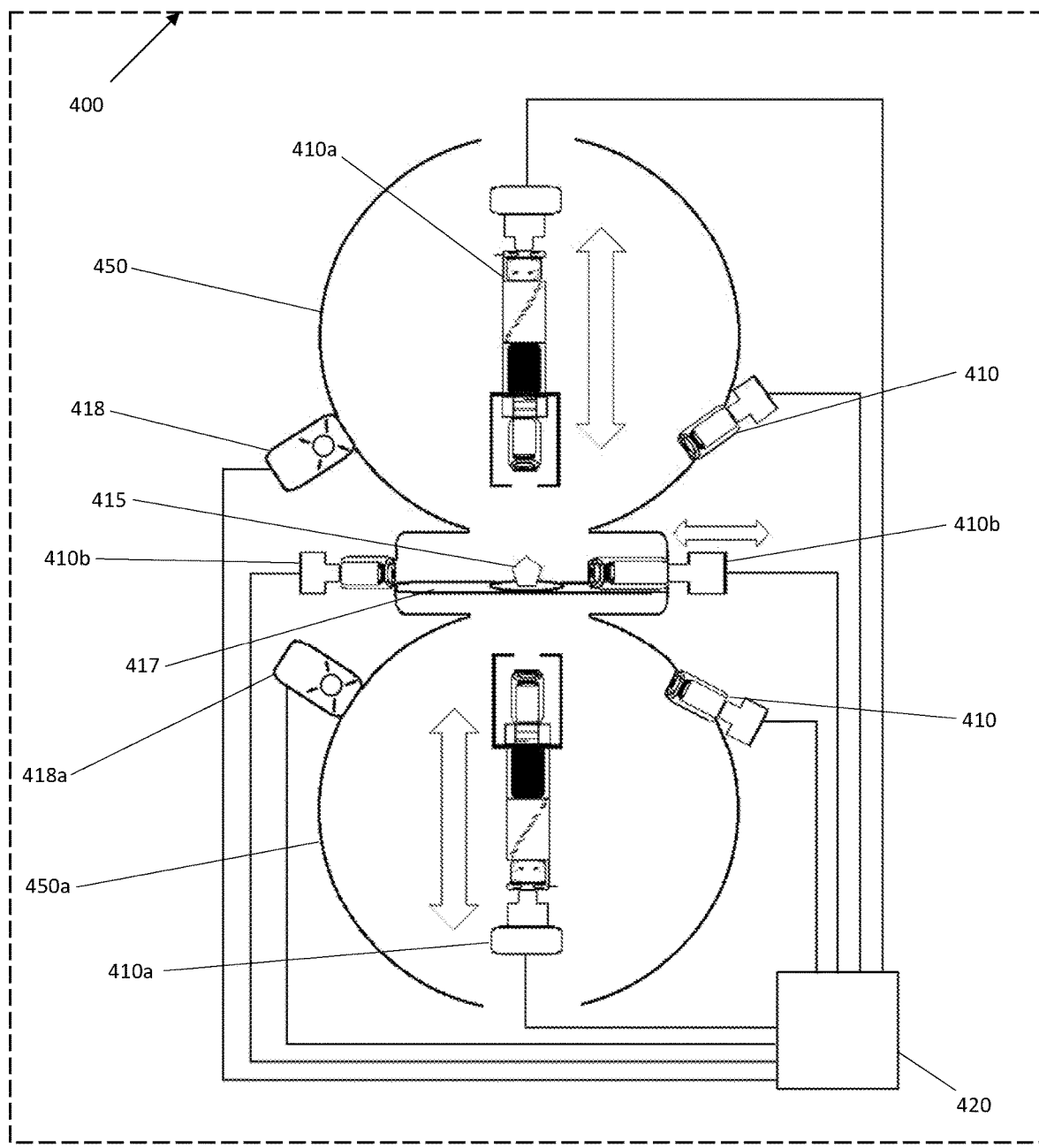
FIG. 4 shows a schematic representation of the sectional view of a further embodiment of the integrating spheres system according to the present invention.

Now referring to FIG. 4, there is shown a schematic representation of another embodiment of a system 400 in accordance with the present invention.

System 400 also includes two integrating spheres 450 and 450a adjoining at spacer portion 416 and being spaced apart by the spacer portion 416. Light sources 418 and 418a are located at each sphere in order to provide a predetermined constant light level within the system of integrating spheres, and provide a predetermined constant light level is of colour temperature 6500K within each integrating sphere 350 and 350a. The light source is selected from the group including an LED (Light Emitting Diode) light source, a Xeon lamp light source, and incandescent light source, and fluorescent lamp light source, a solar simulator or the like, so as to provide a predetermined constant light level within the spheres 450 and 450a of colour temperature 6500K.

The light sources 450 and 450a may be controlled by control module 420.

System 400 further includes a plurality of optical image acquisition devices 410, 410a and 410b with one of the optical image acquisition devices 410a located normal to the rotational platform 417, which is moveable in a vertical direction so as to alter the distance between the diamond 415 and optical image acquisition devices 410a.

There is also optical image acquisition devices 410b in this embodiment, located normal to the central axis of the diamond, which is moveable in a horizontal direction as to alter the distance between the diamond 415 and optical image acquisition device 410b.

As will be appreciated, optical image acquisition device 410b, although provided as a pair on oppose sides of the spheres 450, 450a, may be a single device on one side.

The plurality of optical image acquisition devices 410, 410a and 410b are controlled by the control module 420 which allows for acquisition of the plurality of optical images of the diamond 415 at different angles for colour and clarity grading of diamonds, as well as from above and below the diamond 415.

The height of the diamond 415 may be determined by an optical image acquired via a further optical image acquisition device 410b located normal to the central axis of the diamond.

When acquiring the image from above or below the diamond 415, the apparent focus depth $D_{apparent}$ for focusing is corrected according to the formula:

$$D_{apparent} = \frac{D_{real}}{n_{diamond}}$$

wherein $n_{diamond} \approx 2.42$

With the diamond height inferred from the sideview image, a plurality of images of different focus depths of the diamond can be captured perpendicularly to the table for the detection of defects.

This could be done by dividing the height into corresponding focus depths. However, since the sideview image is captured in air, while the images perpendicular to the table are to be captured in the diamond, the refractive indices difference in air ($n_{air} \approx 1$) and diamond ($n_{diamond} \approx 2.42$) will affect the focus depths determination. Take approximation of the light ray's angle of incidence is small with respect to images captured perpendicularly to the table, the apparent depth $D_{apparent}$ for focusing should be corrected as:

$$D_{apparent} = \frac{D_{real}}{n_{diamond}}$$

instead of the real depth $D_{real}$.

Figure 5:
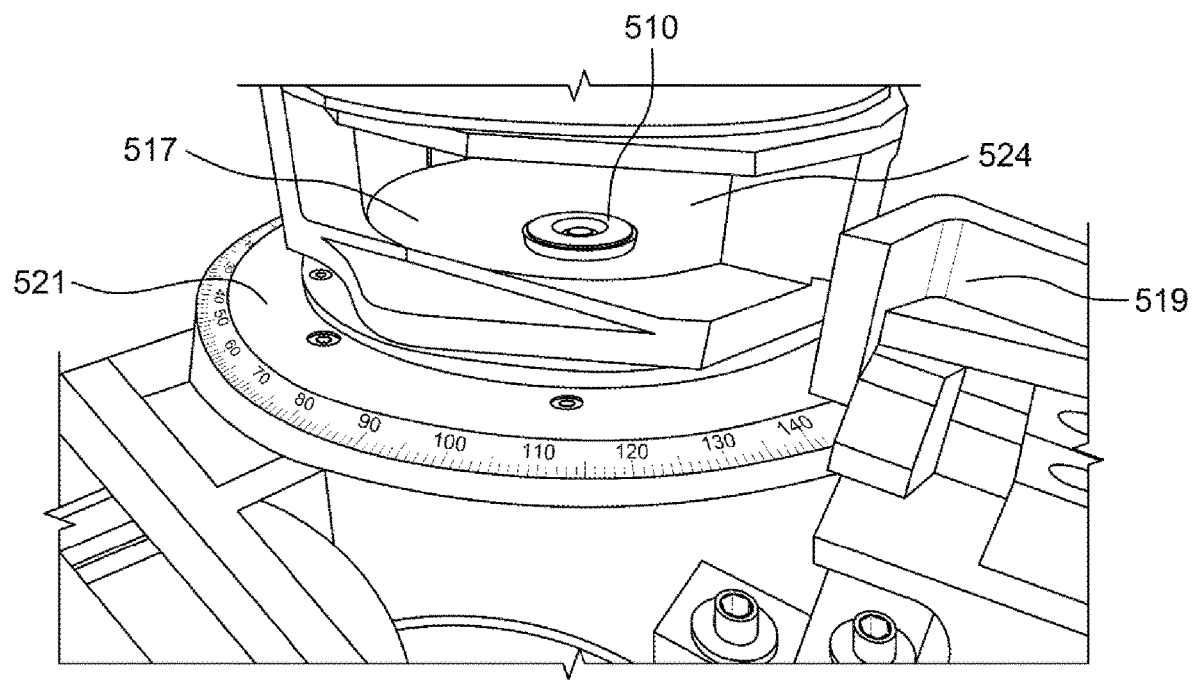
FIG. 5 shows a reference photographic representation of a spacer portion in a preferred embodiment according to the present invention.

Referring now to FIG. 5, there is shown a photographic representation of a spacer portion 516 where the two integrating spheres adjoin and being spaced apart with, similar to that as discussed above with reference to FIGS. 1a-1d and as such, is immediately implementable into systems of the present invention.

The sliding door 519 is opened to the side revealing the aperture 524 at the spacer portion 516, this allows the diamond to be transported into and out of the integrating spheres system, similarly as described above with reference to FIGS. 1a-1d.

Within the spacer portion 516 of the integrating spheres, there is shown a transparent rotational platform 517 which allows for the placing of the diamond during the image acquisition process. Images of the diamond are acquired by the optical image acquisition device 510, which may be a digital camera and is placed normal to the transparent platform 517.

The optical image acquisition device 510 is located at an appropriate distance from the diamond, for example from about 20 mm to 60 mm from the diamond, and is movable in the vertical direction so as to alter the distance from the diamond.

The transparent platform 517 is rotatable by the dial 521 at the outside of the integrating sphere system, which can be controlled by the external control unit, such that images of different views of the diamond can be acquired by the image acquisition device 510.

Figure 6:
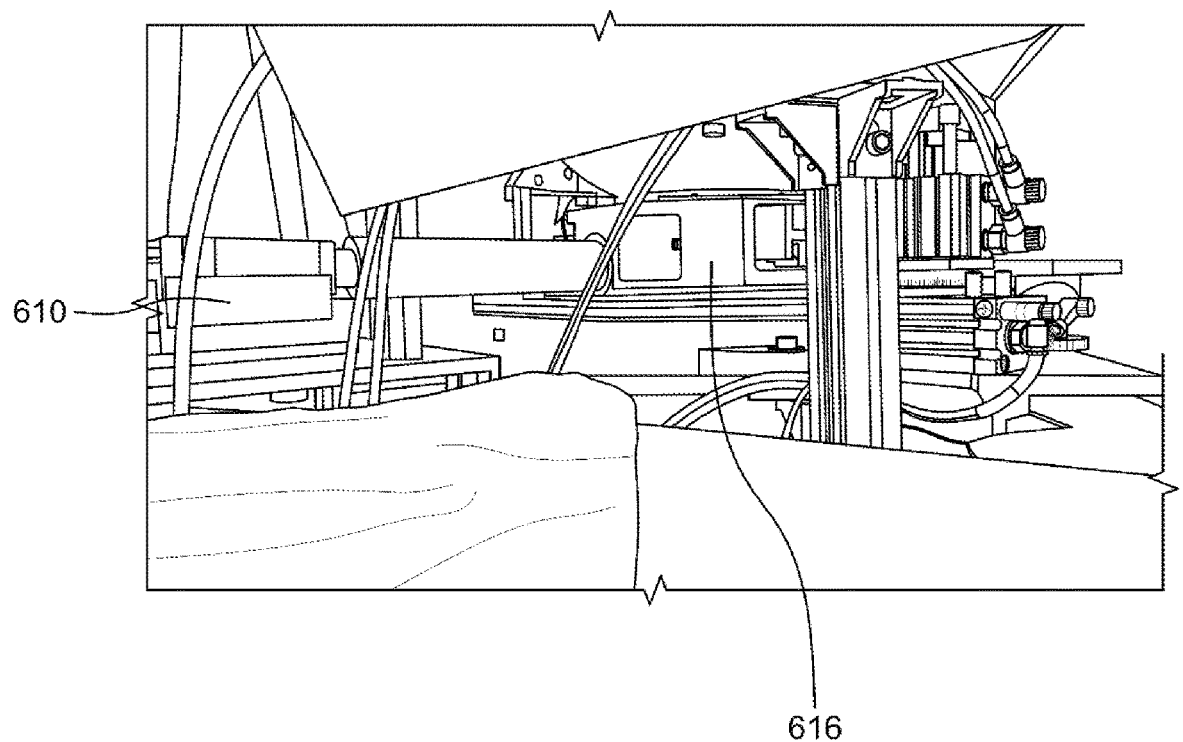
FIG. 6 shows a reference photographic representation of an optical image acquisition device in a preferred embodiment according to the present invention.

Now referring to FIG. 6, there is shown a photographic representation of the side view image acquisition device 610, which is located normal to the central axis of the diamond on the rotational platform within the spacer portion.

The optical image acquisition device 610 is located outside of the integrating sphere system, at an appropriate distance from a diamond.

The side view image acquisition device 610 is connected to the spacer portion 616 of the integrating sphere system with an opaque pipe, which extends through the spacer portion 616, which allows the image acquisition device 610 to only capture the image of the diamond located within the integrating sphere system, and is not optically interfered by the outside environment.

Figure 7:
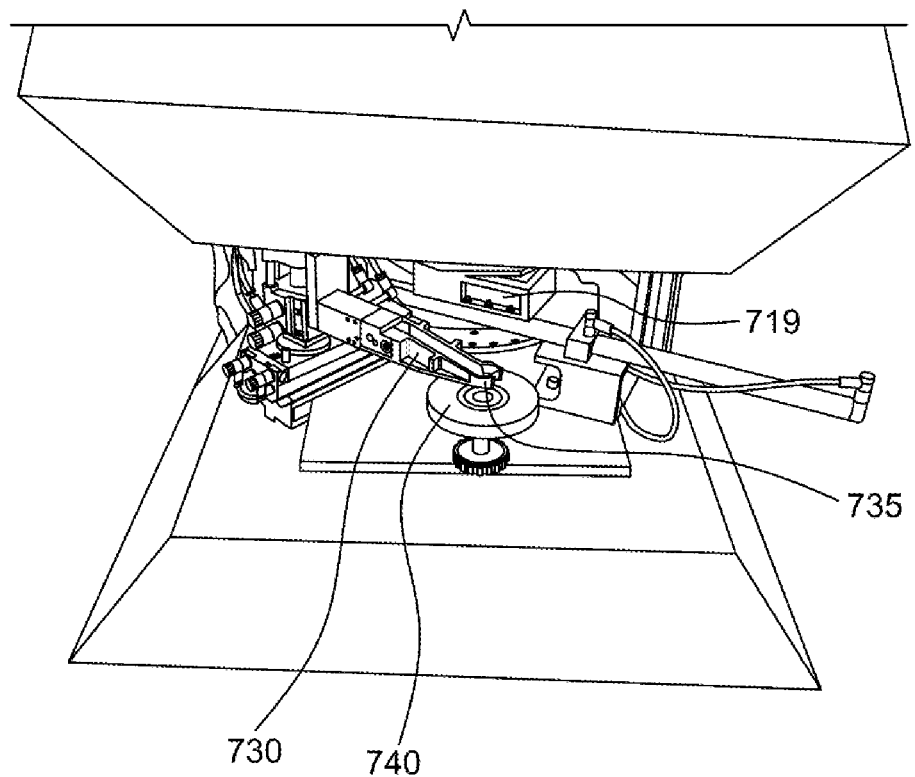
FIG. 7 shows a reference photographic representation of a mechanical arm assembly in a preferred embodiment according to the present invention.

FIG. 7 shows a photographic representation of an example of a mechanical arm 730 applicable for use in the system of the present invention, which is located about at the same horizontal level of the spacer portion 716 of the integrating spheres system.

The mechanical arm 730 allows for transporting the diamond automatically into and out of the integrating spheres. The mechanical arm 730 is moveable in a vertical direction for picking up and releasing the diamond, and rotatable about the central axis for transporting the diamond from one position to the other.

When a diamond is placed on the surface 740, the claw portion 735 of the mechanical arm 730 picks the diamond up from the surface 740, which then rotates and transport the diamond into the spacer portion 730 of the integrating spheres, similarly as described above in reference to FIGS. 1a-1d.

The sliding door 719 is closed when there is no transporting of diamonds into and out of the integrating spheres system. This protects the interior of the integrating spheres, and provides an optically close system for image acquisition of diamonds.

Figure 8:
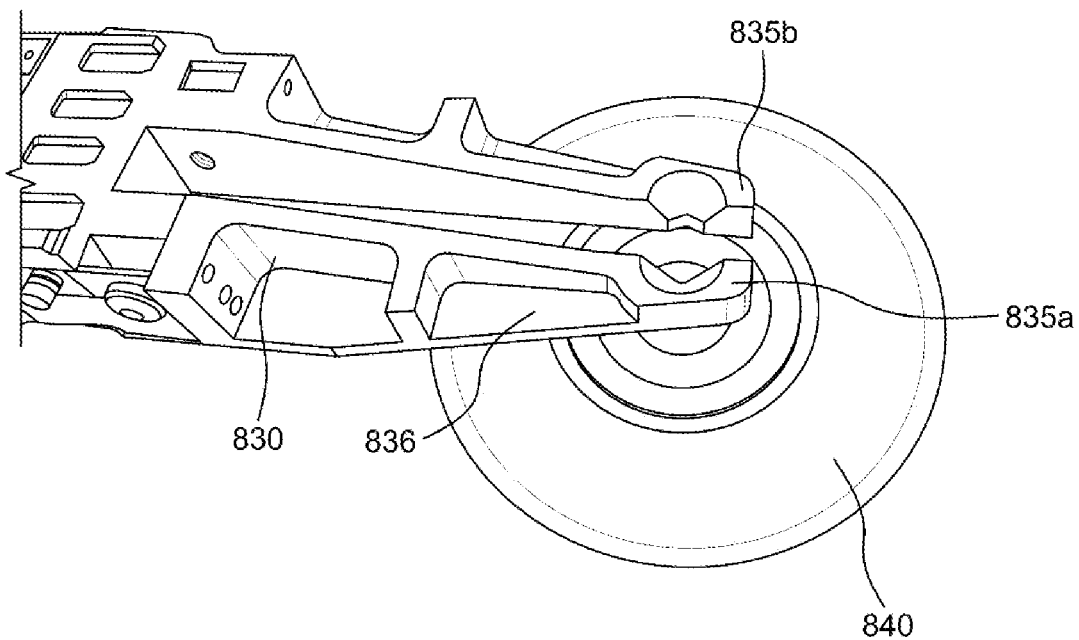
FIG. 8 shows a reference photographic representation of a close-up view of the claw portion of a mechanical arm in a preferred embodiment according to the present invention.
Figure 9A:
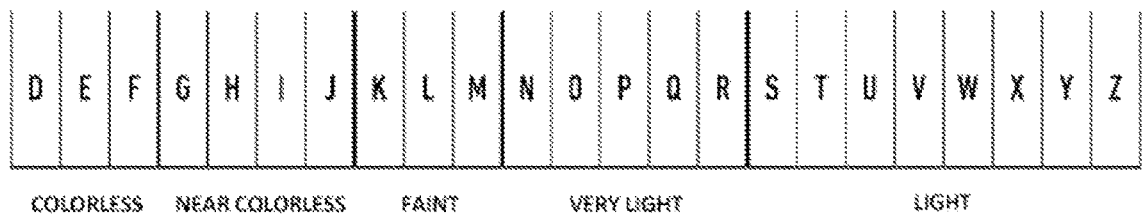
FIG. 9a shows the Gemological Institute of America (GIA) colour scale, against which a colour grading is applied, with the grades shown from colourless to light.
Figure 9B:
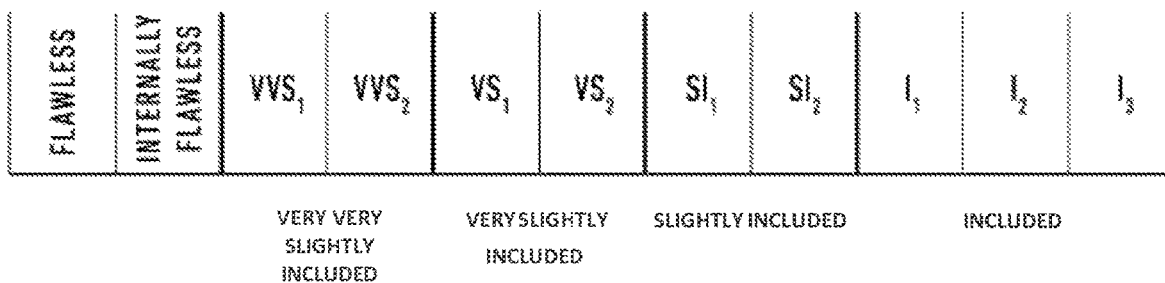
FIG. 9b shows that the Gemological Institute of America (GIA) has a clarity grade.

FIG. 8 shows a photographic representation of a close-up view of the mechanical arm 830, which consists of two claws 835a and 835b for picking up and securing a diamond therein.

Since metal is relatively softer than a diamond, when they are in contact with each other, there exists possibilities that metal impurities will be adhered to the surface of a diamond which may contaminate or even create scratches thereon.

It is highly undesirable for precious stones such as diamonds to be scratched or contaminated during the grading process. Any defects applied to the diamond may devalue the diamond and cause great economic loss.

In order to prevent any metal impurities being adhered on the surface of the diamond during the pick-up process by the metal claws 835a and 835b, a coating 821 is applied to the surface of the metal claw portion 835 of the mechanical arm 830, especially to the surface where the claws make direct contact with the diamond.

It can be shown in FIG. 8 that the surface of the claw portion 835 appears lighter in colour, which refers to the coating thereon to protect any diamonds in contact with the claws from being contaminated.

The coating can be a metal oxide layer, quartz or the like, which prevents metal impurities of the claws to be adhered on to the surface of diamond during the pick-up procedure.

The computerized system accordingly to the present invention is advantageous over the prior art by eliminating the problem of vision tiredness, and having algorithm for analysing the colour and defects can provide a good alternative with high repeatability, and allows a processor to determine the optical properties of a gemstone, for example of a diamond, such as colour and clarity, using electronically acquired images of the diamond by the system.

It can also reduce the cost and time to produce master stone sets and train a professional gemologist. It can also reduce the time to train a professional gemologist.

A system of integrating spheres assists in playing this role as the light intensity, spectrum and uniformity can be well controlled and repeated.

A system of integrating spheres can play this role as the light intensity, spectrum and uniformity can be well controlled and repeated. The system can serve for clarity and colour assessment of a diamond.

The invention claimed is:

1. A system for viewing and ascertaining optical characteristics of gemstones, said system including:
    a first and second integrating sphere, wherein each integrating sphere is in optical communication with each other and having a spacer portion disposed therebetween and being spaced apart by the spacer portion,
    a first light source engaged with the first sphere and for providing light to the interior of the first sphere and a second light source engaged with the second sphere and for providing light to the interior of the second sphere, and wherein the light sources are located at each sphere in order to provide a predetermined constant light level within the integrating sphere, and provide controlled light intensity, spectrum and uniformity;
    at least one optical image acquisition device in communication with the interior of one of the spheres for acquisition of an optical image of a gemstone disposed in a region between the spheres;

a transparent platform for supporting the gemstone between the two integrating spheres; and a control module in communication with the optical image acquisition device, for controlling the acquisition of optical images of diamonds thereof;

wherein said optical image of the gemstone is processed by a processor to ascertain one or more optical characteristics of the gemstone; and wherein said system further includes a mechanical arm controlled by the control module, for delivery of a gemstone from external of the integrating spheres to the platform, and wherein said system further includes a movable door located at the spacer portion which is openable to allow the gemstone to be transported to and from the platform by the mechanical arm.

2. The system according to claim 1, wherein interior of the integrating spheres is covered with a diffuse reflective coating such that light rays incident on any point on the inner surface are, by multiple scattering reflections, distributed equally to all other points, and the effects of the original direction of the light sources are minimized.

3. The system according to claim 1, wherein said mechanical arm allows for movement in a vertical direction for picking up and releasing the gemstone, and rotation about an axis for transporting the gemstone from one position to the other.

4. The system according to claim 1, wherein the system includes a plurality of optical image acquisition devices in communication with the interior of at least one of the spheres.

5. The system according to claim 1, wherein the system includes a first optical image acquisition device in communication with the interior of the first sphere at pole of the sphere.

6. The system according to claim 5, wherein the system includes a further optical image acquisition device in communication with the interior of the second sphere at a pole of the sphere.

7. The system according to claim 1, including one or more optical image acquisition devices for acquiring a side image of the gemstone, wherein one or more optical image acquisition devices acquires said side image of the gemstone through an aperture extending through the spacer portion.

8. The system according to claim 1, including one or more optical image acquisition devices for acquiring an inclined image of the gemstone, wherein one or more optical image acquisition devices is directed towards the gemstone and is inclined to an axis extending through the poles of the spheres.

9. The system according to claim 8, wherein said one or more optical image acquisition devices is directed towards the gemstone and is inclined at an angle in the range of from 40 degrees to 50 degrees to an axis extending through the poles of the spheres.

10. The system according to claim 1, wherein the at least one optical image acquisition device is located at a distance in the range of 100 mm and 300 mm from the gemstone.

11. The system according to claim 1, wherein the at least one optical image acquisition device is located at a distance of 200 mm from the gemstone.

12. The system according to claim 1, wherein the at least one optical image acquisition device is located at a distance in the range of from 20 mm to 100 mm from the gemstone.

13. The system according to claim 1, wherein the light sources provide a predetermined constant light level of colour temperature 6500K.

14. The system according to claim 1, wherein the light source is selected from the group including an LED (Light Emitting Diode) light source, a Xeon lamp light source, and incandescent light source, and fluorescent lamp light source or a solar simulator.

15. The system according to claim 1, wherein the platform is rotatable about the central axis extending between the pole of the spheres and within the system of integrating spheres, and provides for rotation of the gemstone about the central axis such that a plurality of optical images of the gemstones can be acquired by the at least one optical image acquisition devices.

16. The system according to claim 1, wherein the at least one optical image acquisition device is a digital camera.

17. The system according to claim 1, wherein the at least one optical image acquisition device is monochromatic.

18. The system according to claim 1, wherein the system provides for determining the colour of a gemstone.

19. The system according to claim 1, wherein the system provides for determining the clarity of a gemstone.

20. The system according to claim 1, wherein the gemstone is diamond.

21. The system according to claim 1, wherein the at least one optical image acquisition device is polychromatic.

* * * * *